(12) United States Patent  (10) Patent No.: US 12,062,137 B2
Ogasawara  (45) Date of Patent: Aug. 13, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Taku Ogasawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 17/669,400

(22) Filed: Feb. 11, 2022

(65) Prior Publication Data

US 2022/0277520 A1 Sep. 1, 2022

(30) Foreign Application Priority Data

Feb. 26, 2021 (JP) ................. 2021-030905

(51) Int. Cl.
*G06T 17/20* (2006.01)
*G06T 15/20* (2011.01)
*H04N 13/117* (2018.01)
*H04N 13/275* (2018.01)

(52) U.S. Cl.
CPC ............ *G06T 17/20* (2013.01); *G06T 15/20* (2013.01); *H04N 13/117* (2018.05); *H04N 13/275* (2018.05)

(58) Field of Classification Search
CPC ....... G06T 17/20; G06T 15/20; H04N 13/117; H04N 13/275
See application file for complete search history.

(56) References Cited

U.S. PATENT DOCUMENTS 11,244,423 B2   2/2022   Ogasawara
2005/0182693 A1 8/2005   Alivandi
2016/0198146 A1* 7/2016  Hayasaka ............ H04N 13/239
                                                            348/48

(Continued)

FOREIGN PATENT DOCUMENTS

EP     3064257 A1     9/2016
GB     2499694 A      8/2013
JP     2020-062322 A  4/2020

OTHER PUBLICATIONS

Extended European Search Report issued by the European Patent Office on Jul. 12, 2022 in corresponding EP Patent Application No. 22158029.3.

*Primary Examiner* — Michelle Chin
(74) *Attorney, Agent, or Firm* — Carter, DeLuca & Farrell LLP

(57) ABSTRACT

An information processing apparatus has an identification unit, an obtaining unit, and an output unit. The identification unit identifies, in a virtual viewpoint image generated using shape data representing a three-dimensional shape of an object, a target for which to generate data for modeling a three-dimensional object, based on time information related to the virtual viewpoint image as well as a position of a virtual viewpoint and a direction of a line of sight from the virtual viewpoint related to the virtual viewpoint image. The obtaining unit obtains shape data on a first object in the virtual viewpoint image, the first object corresponding to the identified target. The output unit outputs data for modeling a three-dimensional object generated based on the obtained shape data.

15 Claims, 9 Drawing Sheets

(56) References Cited

U.S. PATENT DOCUMENTS

| | | | |
|---|---|---|---|
| 2017/0124422 A1* | 5/2017 | Tada | ........................ G06T 17/00 |
| 2019/0026589 A1* | 1/2019 | Sugihara | .................. G06T 19/20 |
| 2021/0235014 A1 | 7/2021 | Ogasawara | |
| 2021/0266511 A1 | 8/2021 | Ogasawara | |
| 2021/0349620 A1 | 11/2021 | Ogasawara | |

\* cited by examiner

FIG.6A 610

| OBJECT \ TIME CODE | ... | 16:14:24.041 | 16:14:24.042 | ... | 16:14:25.001 | 16:14:25.002 | ... | 16:14:25.021 | ... |
|---|---|---|---|---|---|---|---|---|---|
| A | ... | Data A100 | Data A101 | ... | Data A120 | Data A121 | ... | Data A141 | ... |
| B | ... | Data B100 | Data B101 | ... | Data B120 | Data B121 | ... | Data B141 | ... |
| ... | ... | ... | ... | ... | ... | ... | ... | ... | ... |
| N | ... | Data N100 | Data N101 | ... | Data N120 | Data N121 | ... | Data N141 | ... |

FIG.6B 620

| ITEM | DATA |
|---|---|
| COORDINATES OF ALL DOTS | |
| TEXTURE | |
| AVERAGE COORDINATES | |
| BARYCENTRIC COORDINATES | |
| MAXIMUM/MINIMUM COORDINATES | |

INFORMATION PROCESSING APPARATUS, INFORMATION PROCESSING METHOD, AND STORAGE MEDIUM

BACKGROUND

Field

The present disclosure relates to a technique for generating object modeling data from moving images.

Description of the Related Art

In recent years, by use of a modeling apparatus such as a 3D printer, it has been possible to model a figure of an object based on a three-dimensional model (hereinafter referred to as a 3D model) which is data representing the three-dimensional shape of the object. Target objects include not only game or animation characters but also actual people. By inputting a 3D model obtained by capturing images of or scanning an actual person or the like to a 3D printer, a figure which is one tenth or less of the actual size of the person or the like can be modeled.

Japanese Patent Laid-Open No. 2020-62322 discloses a method for modeling a doll of a desired object by having a user select a desired scene or an object included in the scene from a list of highlight video scenes created by capturing images of a sports game.

SUMMARY

However, in Japanese Patent Laid-Open No. 2020-62322, an object to be modeled can be selected only from the highlight scenes in the list, and it is difficult to model a doll of an object included in a scene not in the list.

The present disclosure aims to facilitate modeling of a three-dimensional object of an object to be modeled in any scene in moving images.

An information processing apparatus according to an aspect of the present disclosure includes: one or more processors functioning by executing instructions stored in one or more memories as the following units: an identification unit that identifies, in a virtual viewpoint image generated using shape data representing a three-dimensional shape of an object, a target for which to generate data for modeling a three-dimensional object, based on time information related to the virtual viewpoint image as well as a position of a virtual viewpoint and a direction of a line of sight from the virtual viewpoint related to the virtual viewpoint image, an obtaining unit that obtains shape data on a first object in the virtual viewpoint image, the first object corresponding to the target identified by the identification unit, and an output unit that outputs data for modeling a three-dimensional object generated based on the shape data obtained by the obtaining unit.

Further features of the present disclosure will become apparent from the following description of exemplary embodiments with reference to the attached drawings.

BRIEF DESCRIPTION OF THE DRAWINGS

FIGS. 6A and 6B are diagrams showing an example of information managed by a database;

DESCRIPTION OF THE EMBODIMENTS

Figure 1A:
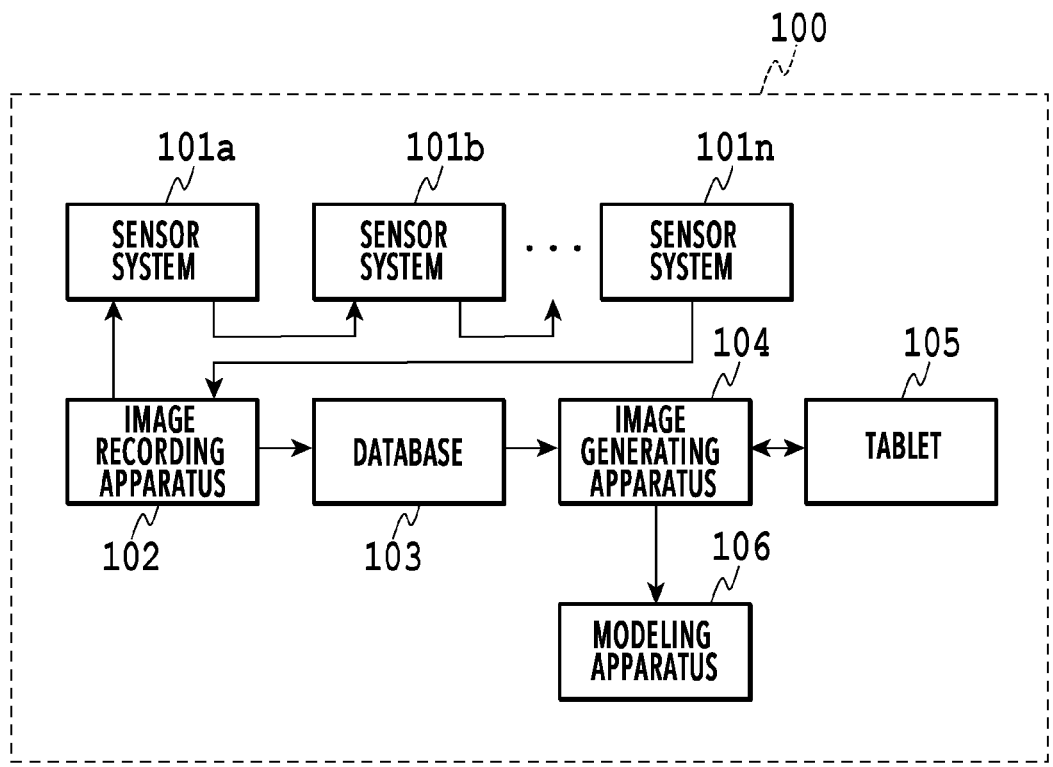
FIGS. 1A and 1B are diagrams showing an example configuration of an information processing system.

Embodiments of the present disclosure are described below with reference to the drawings. Note that the embodiments below are not intended to limit the present disclosure according to the scope of claims, and not all of the combinations of features described in the embodiments are necessarily essential as the solving means of the present disclosure. Also note that the same constituent elements are denoted by the same reference numerals to omit their descriptions.

Embodiment 11

In the present embodiment, a description is given of how modeling data is generated by a system that renders a virtual viewpoint image using three-dimensional shape data (hereinafter referred to as a 3D model) representing the three-dimensional shape of an object, the 3D model being obtained based on images captured from a plurality of viewpoints and being used to generate the virtual view point image. A virtual viewpoint image is an image generated based on the position of a virtual viewpoint and the direction of the line of sight from the virtual viewpoint specified by an end user and/or an appointed operator or the like, and is also called, e.g., a free-viewpoint image or an arbitrary-viewpoint image. A virtual viewpoint image may either be a video or a still image, but in the present embodiment, a case of a video is described as an example. Note that in the following description, a virtual viewpoint is primarily described as a virtual camera. In the following description, the position of a virtual viewpoint corresponds to the position of a virtual camera, and the direction of the line of sight from the virtual viewpoint corresponds to the attitude of the virtual camera.

(System Configuration)

Figure 1B:
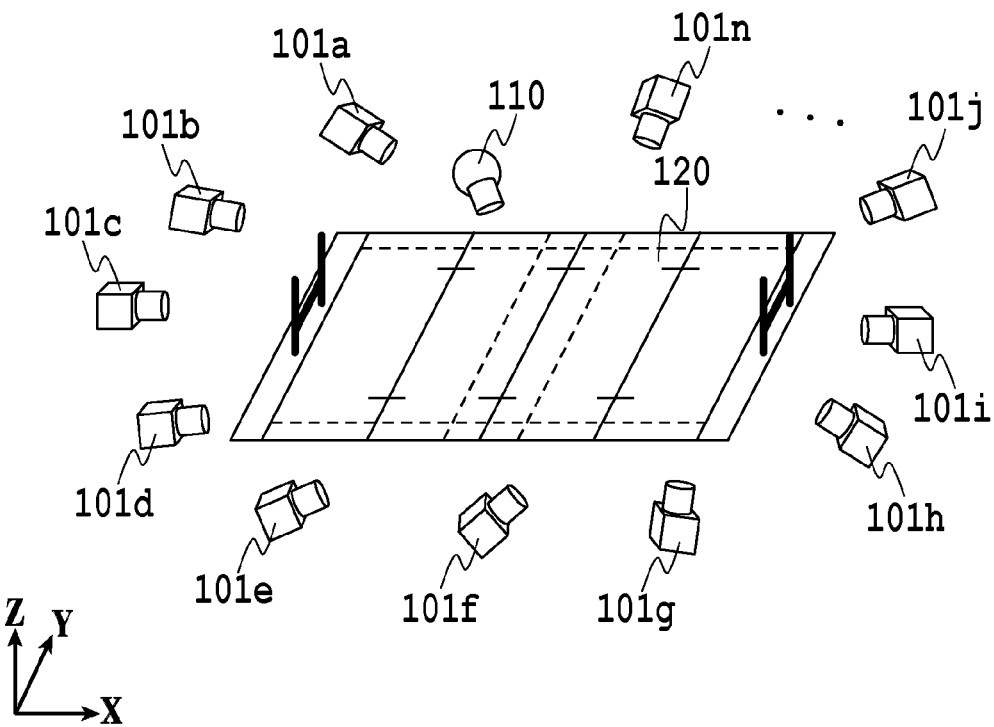

FIGS. 1A and 1B are diagrams showing an example configuration of an information processing system (a virtual viewpoint image generating system) that generates modeling data on an object in a virtual viewpoint image in order to model a three-dimensional object of the object to be modeled. FIG. 1A shows an example configuration of an information processing system 100, and FIG. 1B shows an example of how sensor systems of the information processing system are installed. The information processing system 100 has n sensor systems 101a to 101n, an image recording apparatus 102, a database 103, an image generating apparatus 104, and a tablet 105. The sensor systems 101a to 101n each have at least one camera as an image capturing apparatus. Note that the following description does not distinguish the n sensor systems, namely the sensor systems 101a to 101n, from one another and refer to them as a plurality of sensor systems 101, unless otherwise noted.

Using FIG. 1B, a description is given of an example of how the plurality of sensor systems 101 and a virtual camera are installed. As shown in FIG. 1B, the plurality of sensor systems 101 are installed to surround a region 120 which is an image capture target region, and the cameras of the plurality of sensor systems 101 capture images of the region 120 from different directions from one another. A virtual camera 110 captures images of the region 120 from a direction different from any of the cameras of the plurality of sensor systems 101. Details of the virtual camera 110 will be described later.

In a case where an image capture target is a game of a professional sport such as rugby or soccer, the region 120 is the field (the ground) in a stadium, and the n (e.g., 100) sensor systems 101 are installed to surround the field. The image capture target region 120 may have not only people on the field but also a ball or other objects. Note that the image capture target is not limited to a field in a stadium, but also a music live event held in an arena or the like or a commercial shooting in a studio, as long as the plurality of sensor systems 101 can be installed. Note that the number of sensor systems 101 installed is not limited to any particular number. Also, the plurality of sensor systems 101 do not have to be installed over the entire perimeter of the region 120 and may be installed along only part of the periphery of the region 120 depending on, e.g., restrictions on installation locations. Also, the plurality of cameras of the plurality of sensor systems 101 may include image capturing apparatuses having different functionalities from each other, such as a telephoto camera and a wide-angle camera.

The plurality of cameras of the plurality of sensor systems 101 perform image capture in synchronization with one another and obtain a plurality of images. Note that the plurality of images may be captured images or images obtained by subjecting captured images to image processing such as, e.g., processing to extract a predetermined region.

Note that each of the sensor systems 101a to loin may have a microphone (not shown) in addition to the camera. The microphones of the plurality of sensor systems 101 pick up sound in synchronization. Based on the sound thus picked up, an audio signal can be generated to be played along with display of the images by the image generating apparatus 104. Although descriptions concerning sound are omitted below to simplify description, an image and sound are basically processed together.

The image recording apparatus 102 obtains a plurality of images from the plurality of sensor systems 101, combines the plurality of images thus obtained and a time code used for the image capture, and stores them in the database 103. A time code is time information represented in an absolute value to uniquely identify the time at which the image capture took place, and the time information can be specified with a format such as, for example, date:hour:minute:second.frame number. The time code is also used as time information representing a time related to a virtual viewpoint image.

The database 103 manages event information, 3D model information, and the like. The event information includes data indicating the storage locations of pieces of 3D model information on each object that are associated with all the time codes of an image capture target event. The objects may include not only a person or a non-person object that a user wants to model, but also a person or a non-person object that is not a target to be modeled. The 3D model information includes information related to a 3D model of an object.

The image generating apparatus 104 receives, as inputs, an image according to a time code from the database 103 and information on the virtual camera 110 set by a user operation from the tablet 105. The virtual camera 110 is set in a virtual space associated with the region 120 and can view the region 120 from a viewpoint different from any of the cameras of the plurality of sensor systems 101. Details of the virtual camera 110, how to operate the virtual camera 110, and how the virtual camera 110 operates will be described later using the drawings.

The image generating apparatus 104 generates a virtual-viewpoint-image generating 3D model based on images for a certain time code that are obtained from the database 103 and generates a virtual viewpoint image using the virtual-viewpoint-image generating 3D model thus generated and information on the viewpoint of the virtual camera. The viewpoint information on the virtual camera includes information indicating the position and orientation of the virtual viewpoint. Specifically, the viewpoint information includes a parameter representing the three-dimensional position of the virtual viewpoint and a parameter representing the orientation of the virtual viewpoint in a pan direction, a tilt direction, and a roll direction. Note that a virtual viewpoint image is an image representing what it looks like from the virtual camera 110 and is also called a free-viewpoint video. The virtual viewpoint image generated by the image generating apparatus 104 is displayed on a touch panel of the tablet 105 or the like.

In the present embodiment, based on the rendering range of at least one virtual camera, the image generating apparatus 104 generates modeling data (object shape data) to be used by a modeling apparatus 106, from 3D models corresponding to objects existing in the rendering range. More specifically, the image generating apparatus 104 sets, with respect to a virtual viewpoint image, conditions for specifying an object to be modeled, obtains shape data representing the three-dimensional shape of the object based on the conditions thus set, and generates modeling data based on the shape data thus obtained. Details of the modeling data generation processing will be described later using the drawings. Note that the format of the modeling data generated by the image generating apparatus 104 may be any format processable by the modeling apparatus 106, and may be a format used for typical 3D models, such as a polygon mesh general-purpose format, or a format unique to the modeling apparatus 106. In other words, in a case where the modeling apparatus 106 can process shape data for generating a virtual viewpoint image, the image generating apparatus 104 identifies the shape data for generating a virtual viewpoint image as modeling data. Meanwhile, in a case where the modeling apparatus 106 cannot process shape data for generating a virtual viewpoint image, the image generating apparatus 104 generates modeling data using the shape data for generating a virtual image data.

The tablet 105 is a portable device that has a touch panel having both of the capability as a display unit for displaying images and the capability as an input unit for receiving user operations. The tablet 105 may be a portable device having other capabilities, such as a smartphone. The tablet 105 receives user operations for setting information related to the virtual camera. The tablet 105 displays a virtual viewpoint image generated by the image generating apparatus 104 or a virtual viewpoint image stored in the database 103. The tablet 105 then receives user operations performed with respect to the virtual viewpoint image to set conditions for specifying an object to be modeled. By the user operations, a desired space range and a desired temporal range for generating modeling data are set. Details of how this operation is done will be described later using the drawings. Note that the operation of the virtual camera is not limited to user operations performed with respect to the touch panel of the tablet 105, and may be user operations performed with respect to an operation apparatus such as a three-axis controller.

The image generating apparatus 104 and the tablet 105 may be configured as separate apparatuses as shown in FIGS. 1A and 1B or may be configured integrally. In a case of the integral configuration, the image generating apparatus 104 has a touch panel or the like, receives operations related to the virtual camera, and displays the virtual viewpoint image generated by the image generating apparatus 104 itself directly on the touch panel. Note that the virtual viewpoint image may be displayed on a liquid crystal screen of a device other than the tablet 105 or the image generating apparatus 104.

The modeling apparatus 106 is for example a 3D printer or the like, and in response to an input of modeling data generated by the image generating apparatus 104, the modeling apparatus 106 models a three-dimensional object of an object to be modeled indicated by the modeling data, such as, e.g., a doll (3D model figure) or a relief. Note that the modeling method employed by the modeling apparatus 106 is not limited to, e.g., stereolithography, ink jet, or binder jetting, as long as a three-dimensional object can be modeled. Note that the modeling apparatus 106 is not limited to an apparatus that outputs a three-dimensional object such as a doll, and may be an apparatus that performs printing on a plate or a piece of paper.

The image generating apparatus 104 and the modeling apparatus 106 may be configured as separate apparatuses as shown in FIGS. 1A and 1B or may be configured integrally.

Note that the configuration of the information processing system 100 is not limited to the configuration shown in FIG. 1A, where the tablet 105 and the modeling apparatus 106 are connected to the image generating apparatus 104 on a one-on-one basis. For example, the information processing system may have a plurality of tablets 105 and a plurality of modeling apparatuses 106 connected to the image generating apparatus 104.

(Configuration of the Image Generating Apparatus)

Figure 2A:
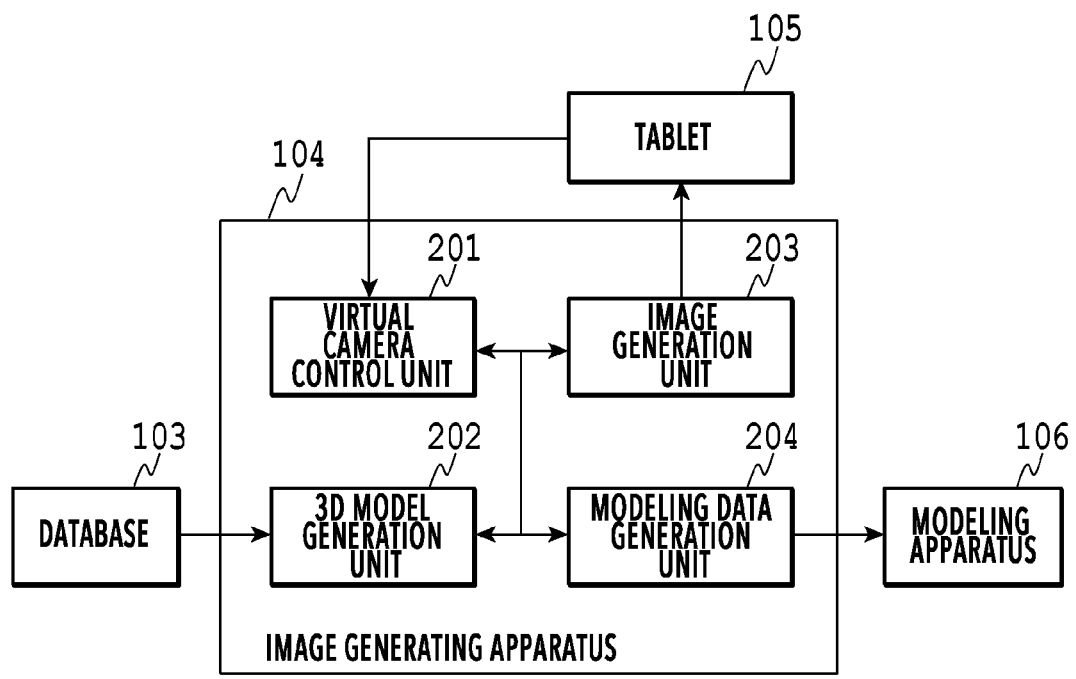
FIGS. 2A and 2B are diagrams showing an example configuration of an image generating apparatus.
Figure 2B:
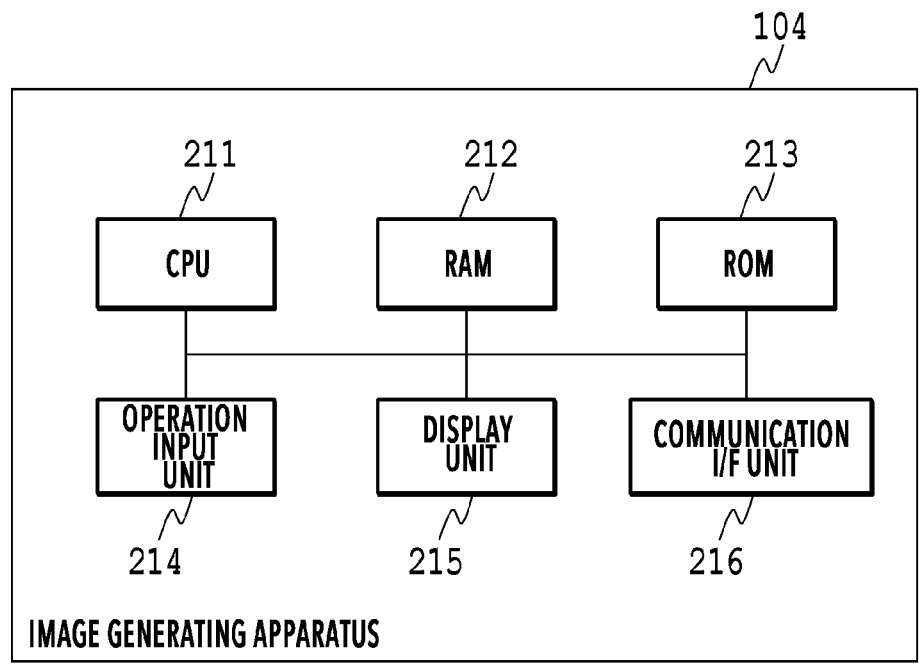

An example configuration of the image generating apparatus 104 is described using the drawings. FIGS. 2A and 2B are diagrams showing an example configuration of the image generating apparatus 104, FIG. 2A showing an example functional configuration of the image generating apparatus 104 and FIG. 2B showing an example hardware configuration of the image generating apparatus 104.

The image generating apparatus 104 has, as shown in FIG. 2A, a virtual camera control unit 201, a 3D model generation unit 202, an image generation unit 203, and a modeling data generation unit 204. The image generating apparatus 104 uses these functional units to generate modeling data based on the rendering range of at least one virtual camera. Overviews of the functions are described here, and details of processing will be described later.

The virtual camera control unit 201 receives virtual camera operation information from the tablet 105 and the like. The virtual camera operation information includes at least the position and attitude of the virtual camera and time code. Details of the virtual camera operation information will be described later using the drawings. Note that in a case where the image generating apparatus 104 has a touch panel or the like and is configured to be able to receive virtual camera operation information, the virtual camera control unit 201 receives the virtual camera operation information from the image generating apparatus 104.

Based on a plurality of captured images, the 3D model generation unit 202 generates a 3D model representing the three-dimensional shape of an object within the region 120. Specifically, the 3D model generation unit 202 obtains, from each of the images, a foreground image which is an extraction of a foreground region corresponding to an object such as a person or a ball and a background image which is an extraction of a background region other than the foreground region. Then, the 3D model generation unit 202 generates a 3D model of each of foreground objects based on the plurality of foreground images.

These 3D models are generated using a shape estimation method such as, e.g., visual hulls, and are each formed by a group of dots. However, the data format of a 3D model representing the shape of an object is not limited to this. Also, the 3D model for the background may be obtained from an external apparatus in advance.

The 3D model generation unit 202 records the generated 3D models in the database 103 along with the time codes.

Note that the 3D model generation unit 202 may be included not in the image generating apparatus 104, but in the image recording apparatus 102. In that case, the image generating apparatus 104 only needs to read 3D models generated by the image recording apparatus 102 from the database 103 via the 3D model generation unit 202.

The image generation unit 203 obtains 3D models from the database 103 and generates a virtual viewpoint image based on the 3D models obtained. Specifically, the image generation unit 203 performs coloring processing on each dot forming the 3D models by obtaining an appropriate pixel value from the images. The image generation unit 203 then disposes the colored 3D models in a three-dimensional virtual space, projects the 3D models onto the virtual camera (the virtual viewpoint), and renders the 3D models, thereby generating a virtual viewpoint image.

However, the method for generating a virtual viewpoint image is not limited to this, and various methods may be used, such as a method that generates a virtual viewpoint image using projective transformation of captured images without using 3D models.

The modeling data generation unit 204 calculates and determines the rendering range or projection range of the virtual camera using the position and attitude of the virtual camera and the time code for the virtual viewpoint image. Then, the modeling data generation unit 204 determines a modeling data generation range based on the determined rendering range of the virtual camera, and generates modeling data from 3D models included in the modeling data generation range. Details of these processes will be described later using the drawings.

(Hardware Configuration of the Image Generating Apparatus)

Next, the hardware configuration of the image generating apparatus 104 is described using FIG. 2B. As shown in FIG. 2B, the image generating apparatus 104 has a central processing unit (CPU) 211, a random-access memory (RAM) 212, a read-only memory (ROM) 213, an operation input unit 214, a display unit 215, and a communication interface (I/F) unit 216.

The CPU 211 performs processing using the programs and data stored in the RAM 212 and the ROM 213.

The CPU 211 performs overall control of the operation of the image generating apparatus 104 and executes processing for implementing the functions shown in FIG. 2A. Note that the image generating apparatus 104 may have one or more dedicated hardware pieces apart from the CPU 211, so that at least part of the processing executed by the CPU 211 may be executed by the one or more dedicated hardware pieces. Examples of the dedicated hardware pieces include an application-specific integrated circuit (ASIC), a field-programmable gate array (FPGA), and a digital signal processor (DSP).

The ROM 213 holds programs and data. The RAM 212 has a work area for temporary storage of programs and data read from the ROM 213. The RAM 212 also provides a work area for the CPU 211 to use in executing processing.

The operation input unit 214 is, for example, a touch panel, and receives an operation inputted by a user and obtains information inputted by the user operation received. Examples of input information include information related to the virtual camera and information related to the time code for a virtual viewpoint image to be generated. Note that the operation input unit 214 may be connected to an external controller and receive operation-related information inputted by a user. The external controller is, for example, an operation apparatus such as a three-axis controller like a joy stick or a mouse. However, the external controller is not limited to these.

The display unit 215 is a touch panel or a screen and displays a virtual viewpoint image generated. In a case of a touch panel, the operation input unit 214 and the display unit 215 are configured integrally.

The communication T/F unit 216 performs transmission and reception of information to and from the database 103, the tablet 105, the modeling apparatus 106, and the like via, for example, a LAN or the like. The communication I/F unit 216 may also transmit information to an external screen via an image output port supporting, e.g., High-Definition Multimedia Interface (HDMI) (registered trademark) or Serial Digital Interface (SDI). The communication I/F unit 216 may also transmit image data and modeling data via, e.g., Ethernet or the like.

(Virtual Camera (or Virtual Viewpoint) and Virtual Camera Operating Screen)

Figure 3A:
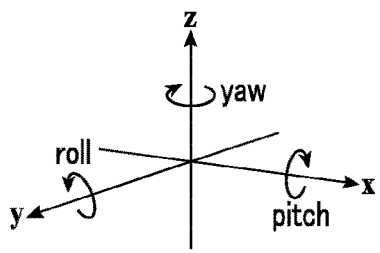
FIGS. 3A to 3F are diagrams showing a virtual camera and a screen for operating the virtual camera.
Figure 3B:
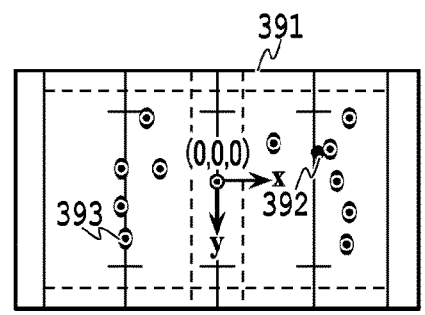
Figure 3C:
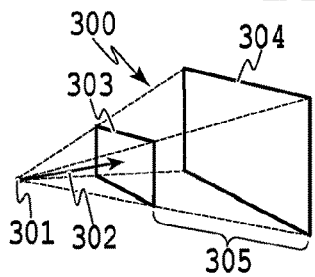
Figure 3D:
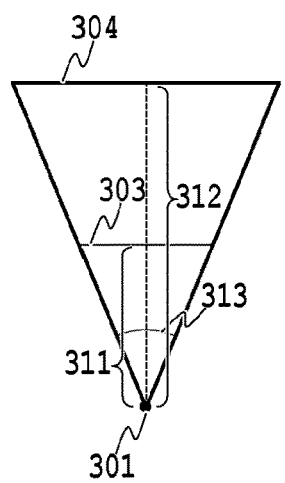
Figure 3E:
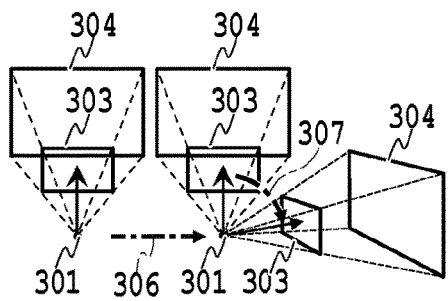
Figure 3F:
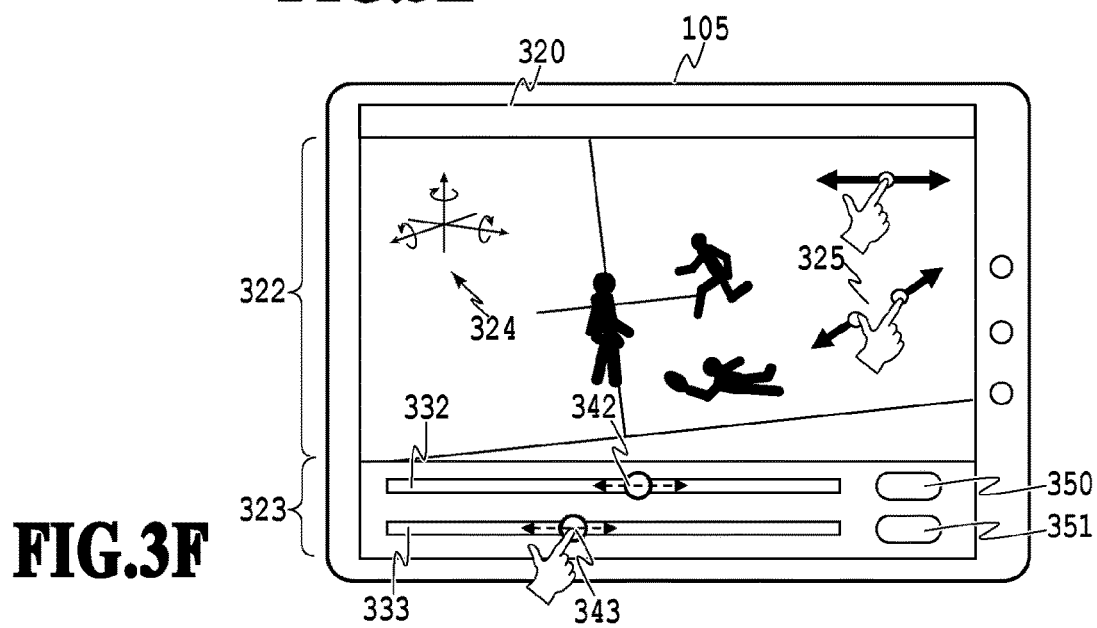

Next, a virtual camera and an operation screen for configuring the settings for the virtual camera are described, taking an example where captured images have been obtained by image capture of a rugby game in a rugby stadium. FIGS. 3A to 3F are diagrams showing a virtual camera and a screen for operating the virtual camera. FIG. 3A shows the coordinate system, FIG. 3B shows an example field to which the coordinate system in FIG. 3A is applied, FIGS. 3C and 3D show an example rendering range of the virtual camera, and FIG. 3E shows an example of how the virtual camera moves. FIG. 3F shows an example of how a virtual viewpoint image viewed from the virtual camera is displayed.

First, a description is given of the coordinate system which represents a three-dimensional space to be captured and which is used as the basis for setting a virtual viewpoint. As shown in FIG. 3A, in the present embodiment, a Cartesian coordinate system which represents a three-dimensional space with three axes, the x-axis, the y-axis, and the z-axis, is used. This Cartesian coordinate system is set for each object shown in FIG. 3B, i.e., a field 391 in the rugby stadium and a ball 392, players 393, and the like on the field 391. The Cartesian coordinate system may also be set for installations (structures) within the rugby stadium such as spectator stands and billboards surrounding the field 391. Specifically, the origin (0, 0, 0) is set at the center of the field 391. Then, the x-axis is set to the direction of the longer side the field 391, the y-axis is set to the direction of the shorter side of the field 391, and the z-axis is set to the direction perpendicular to the field 391. Note that the directions of the axes are not limited to these. The position and attitude of the virtual camera 110 are specified using such a coordinate system.

Next, the rendering range of the virtual camera is described using the drawings. In a quadrangular pyramid 300 shown in FIG. 3C, a vertex 301 represents the position of the virtual camera 110, and a vector 302 in the direction of the line of sight originating from the vertex 301 represents the attitude of the virtual camera 110. Note that the vector 302 is also called an optical-axis vector of the virtual camera. The position of the virtual camera is represented by the components of the axes (x, y, z), and the attitude of the virtual camera 110 is represented by a unit vector having the components of the axes as scalars. The vector 302 that represents the attitude of the virtual camera 110 passes the center points of a front clipping plane 303 and a back clipping plane 304. The viewing frustum of the virtual camera, which serves as a 3D model projection range (the rendering range), is a space 305 between the front clipping plane 303 and the back clipping plane 304.

Next, components indicating the rendering range of the virtual camera are described using the drawings. FIG. 3D is a view showing the virtual viewpoint in FIG. 3C from above (the Z-direction). The rendering range is determined by the following values: a distance 311 from the vertex 301 to the front clipping plane 303, a distance 312 from the vertex 301 to the back clipping plane 304, and an angle of view 313 of the virtual camera 110. These values may be predetermined (prescribed) values set in advance or may be set values to which the predetermined values have been changed by user operations. Also, the angle of view 313 may be a value obtained based on a variable set as the focal length of the virtual camera 110. Note that the relation between an angle of view and a focal length is common technology and is therefore not described here.

Next, a description is given of changing the position of the virtual camera 110 (or moving the virtual viewpoint) and changing (or rotating) the attitude of the virtual camera 110. The virtual viewpoint can be moved and rotated in a space represented by three-dimensional coordinates. FIG. 3E is a diagram illustrating movement and rotation of the virtual camera. In FIG. 3E, a dot-and-dash line arrow 306 represents movement of the virtual camera (or the virtual viewpoint), and a dot-and-dash line arrow 307 represents rotation of the virtual camera (or the virtual viewpoint) thus moved. The movement of the virtual camera is represented by components of the respective axes (x, y, z), and the rotation of the virtual camera is represented by yaw, which is rotation about the z-axis, pitch, which is rotation about the x-axis, and roll, which is rotation about the y-axis. In this way, the virtual camera can be freely moved and rotated in the three-dimensional space of a subject (the field), so that a virtual viewpoint image can be generated with its rendering range being any given region in the subject.

Next, a description is given of an operation screen for setting the position and attitude of the virtual camera (or the virtual viewpoint). FIG. 3F is a diagram illustrating an example screen for operating the virtual camera (or the virtual viewpoint).

In the present embodiment, the modeling data generation range is determined based on the rendering range of at least one virtual camera. Thus, a virtual camera operation screen 320 shown in FIG. 3F can also be said to be an operation screen for determining the modeling data generation range. In FIG. 3F, the virtual camera operation screen 320 is displayed on the touch panel of the tablet 105. Note that the operation screen 320 is not limited to being displayed on the touch panel of the tablet 105, and may be displayed on, e.g., a touch panel of the image generating apparatus 104.

On the operation screen 320, the rendering range of the virtual camera (a rendering range related to image capture of a virtual viewpoint image) is presented as a virtual viewpoint image to fit within the screen frame of the operation screen 320. Aided by such presentation, a user can set conditions for specifying an object to be modeled while visually checking the image.

The operation screen 320 has a virtual camera operation region 322 that receives a user operation for setting the position and attitude of the virtual camera 110 and a time code operation region 323 that receives a user operation for setting a time code. First, the virtual camera operation region 322 is described. Since the operation screen 320 is displayed on the touch panel, the virtual camera operation region 322 receives typical touch operations 325 such as a tap, a swipe, a pinch-in, and a pinch-out as user operations. In response to this touch operation 325, the position or the focal length (the angle of view) of the virtual camera is adjusted. The virtual camera operation region 322 also receives, as a user operation, a touch operation 324 such as holding down on an axis in the Cartesian coordinate system. In response to this touch operation 324, the virtual camera 110 is rotated about the x-axis, the y-axis, or the z-axis to adjust the attitude of the virtual camera. By allocation of touch operations performed on the operation screen 320 to moving and rotating the virtual camera, scaling up, and scaling down in advance, the virtual camera 110 can be freely operated. The method for the above operation is publicly known and is therefore not described here.

Note that an operation related to the position and attitude of the virtual camera is not limited to a touch operation on a touch panel, and may be performed using, e.g., an operation apparatus such as a joy stick.

Next, the time code operation region 323 is described. The time code operation region 323 has a main slider 332 and a knob 342 as well as a sub slider 333 and a knob 343 as a plurality of elements for operating the time code. The time code operation region 323 has a virtual camera add button 350 and an output button 351.

The main slider 332 is an input element with which an operation can be performed to select a desired time code from among all the time codes in image capture data. Once the position of the knob 342 is moved to a desired position by a drag operation or the like, a time code corresponding to the position of the knob 342 is specified. In other words, adjusting the position of the knob 342 on the main slider 332 allows specification of any given time code.

The sub slider 333 is an input element where a part of all the time codes is presented in magnification so that a specific time code within the magnified part can be set by an operation thereof. Once the position of the knob 343 is moved to a desired position by a drag operation or the like, a time code corresponding to the position of the knob 343 is specified. The main slider 332 and the sub slider 333 are the same in length but are different in the length of time codes selectable therein. For example, the main slider 332 allows a user to select a time code from a three-hour-long window which is the length of one game, while the sub slider 333 allows a user to select a time code from a thirty-second window which is a part thereof. In this way, the scale provided by each slider is different, and the sub slider allows a user to specify a more specific time code, such as in seconds or in frames.

Note that the time code specified using the knob 342 on the main slider 332 and the knob 343 on the sub slider 333 may be presented in a numerical value in the format of date:hour:minute:second.frame number. The sub slider 333 may be constantly or temporarily presented on the operation screen 320. For example, the sub slider 333 may be presented in response to an instruction to present time code or in response to an instruction to perform a particular operation such as pause. The section from which a time code is selectable using the sub slider 333 may be variable.

A viewpoint image generated in accordance with the position and attitude of the virtual camera and the time code set by the above operations is presented in the virtual camera operation region 322. In an example in FIG. 3F, the subject is a rugby game, and a scene of a critical pass that leads to a score is shown. Although details will be described later, this critical scene is to be generated or outputted as shape data on an object to be modeled.

FIG. 3F shows a case where the time code specified is the instance at which the ball is let go. Instead, for example, a time code at which the ball is in the air can also be specified easily by operation of the sub slider 333 in the time code operation region 323.

FIG. 3F shows a case where the position and attitude of the virtual camera are specified so that three players may be within the rendering range, but the present disclosure is not limited to this. For example, it is possible to freely operate the space (the rendering range of the virtual camera) 305 by performing the touch operations 324, 325 on the virtual camera operation region 322 so that players around those players may be in the rendering range.

The output button 351 is a button operated to determine the rendering range of the virtual camera set by user operations performed on the virtual camera operation region 322 and the time code operation region 323 and to output shape data on an object to be modeled. Once a time code indicating a temporal range and the position and attitude indicating a spatial range are determined with respect to the virtual camera, the rendering range of the virtual camera is calculated according to the temporal and spatial ranges thus determined. Then, a modeling data generation range is determined based on the rendering range of the virtual camera which is a result of the calculation. Details of this processing will be described later using the drawings.

The virtual camera add button 350 is a button to be used to use a plurality of virtual cameras to generate modeling data. Details of the processing to generate modeling data using a plurality of virtual cameras will be described in Embodiment 2 and is therefore not described here.

Note that the virtual camera operation screen is not limited to the operation screen 320 shown in FIG. 3F, as long as operations for setting the position and attitude of the virtual camera and the time code can be performed. For example, the virtual camera operation region 322 and the time code operation region 323 do not have to be separated from each other. For example, in response to an operation such as a double tap performed on the virtual camera operation region 322, processing such as pausing may be performed as an operation for setting a time code.

Also, the operation input unit 214 is not limited to the example described above where the operation input unit 214 is the tablet 105. The operation input unit 214 may be an operation apparatus having a typical display, a three-axis controller, and the like.

(Modeling Data Generation Processing)

Figure 4:
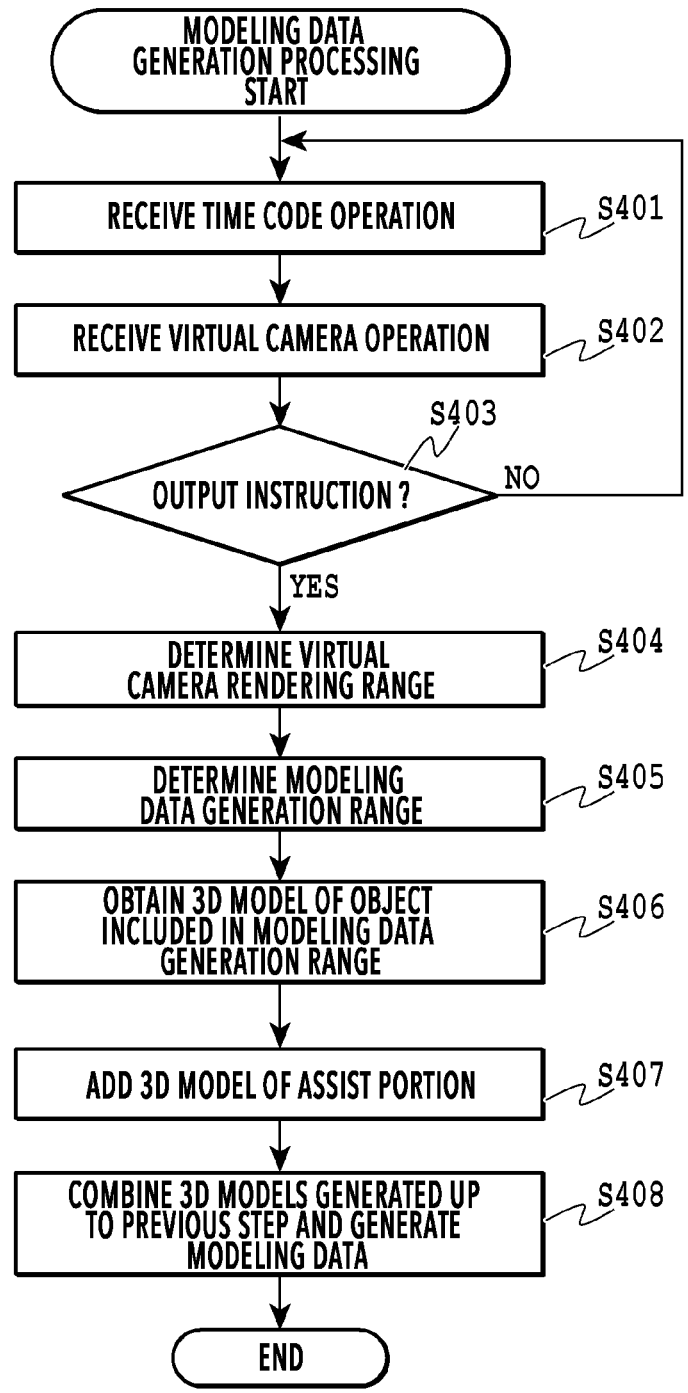
FIG. 4 is a flowchart showing a sequence of steps of modeling data generation processing.

Next, using the drawings, a description is given of modeling data generation processing performed by the image generating apparatus 104. FIG. 4 is a flowchart showing a sequence of steps of the modeling data generation processing. Note that the sequence of the following processing steps are implemented by the CPU 211 executing a predetermined program to effect the operation of the functional units shown in FIG. 2A. Hereinbelow, "S" denotes Step. This applies to the rest of the description. Note that the following description assumes that shape data which represents the three-dimensional shape of an object and is used to generate a virtual viewpoint image is in a different format from modeling data.

In S401, the modeling data generation unit 204 receives specification of a time code for a virtual viewpoint image via the virtual camera control unit 201. The time code may be specified by, e.g., use of sliders as shown in FIG. 3F or direct input of numbers.

In S402, the modeling data generation unit 204 receives virtual camera operation information via the virtual camera control unit 201. The virtual camera operation information includes at least information related to the position and attitude of the virtual camera. The virtual camera may be operated using, e.g., a tablet as shown in FIG. 3F or an operation apparatus such as a joy stick.

In S403, the modeling data generation unit 204 determines, via the virtual camera control unit 201, whether an output instruction has been received, i.e., whether the output button 351 has been operated. If it is determined that an output instruction has been received (YES in S403), the modeling data generation unit 204 moves processing to S404. If it is determined that an output instruction has not been received (NO in S403), the modeling data generation unit 204 moves processing back to S401 to execute the processing in S401 and S402 again. In other words, the processing to receive user operations regarding a time code for a virtual viewpoint image and the position and attitude of the virtual camera is continued until an output instruction is received.

In S404, the modeling data generation unit 204 determines the rendering range of the virtual camera using the time code for a virtual viewpoint image received in the processing in S401 and virtual camera line-of-sight information including the position and attitude of the virtual camera received in the processing in S402. The virtual camera rendering range may be determined by user operations specifying the front clipping plane 303 and the back clipping plane 304 shown in, e.g., FIGS. 3C and 3D or may be determined based on results of computation performed using a computation formula set in the apparatus in advance.

Figure 5A:
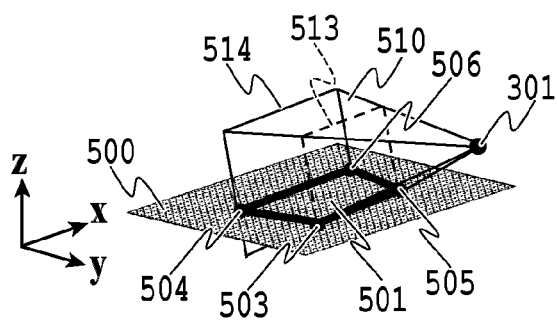
FIGS. 5A to 5F are diagrams showing an example of a modeling data generation range and how it is generated.
Figure 5B:
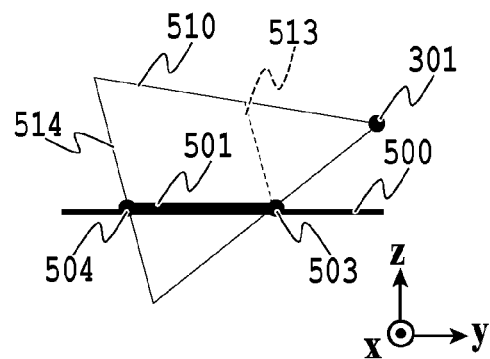
Figure 5C:
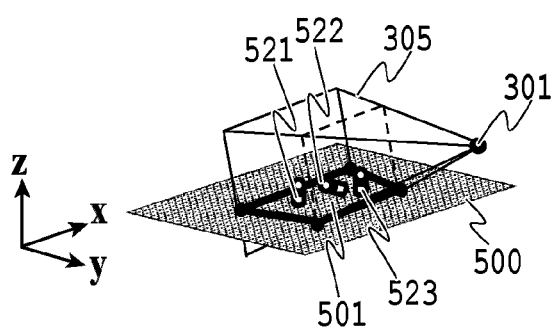
Figure 5D:
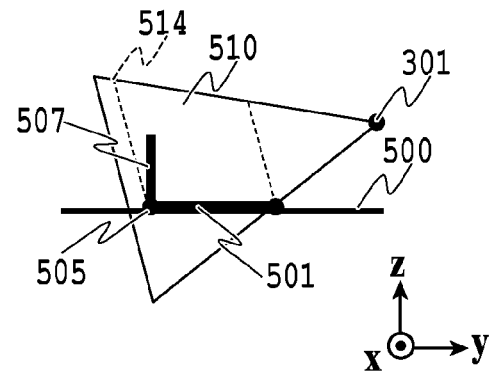
Figure 5E:
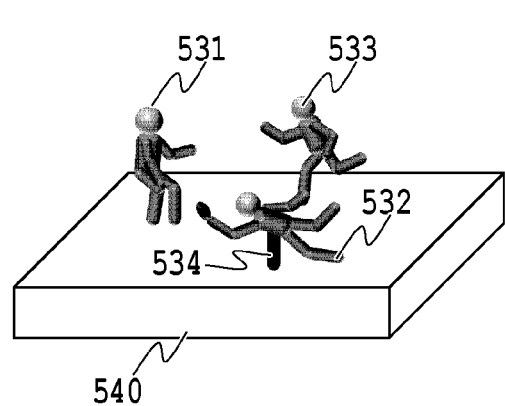
Figure 5F:
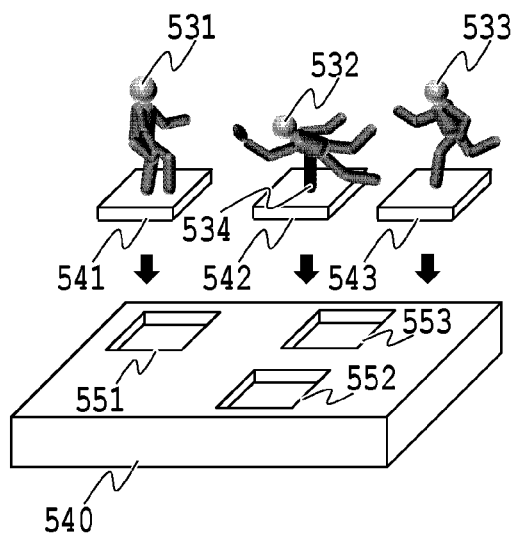

In S405, based on the virtual camera rendering range determined in S404, the modeling data generation unit 204 determines a modeling data generation range corresponding to this virtual camera. A description is given of how to determine the modeling data generation range. FIGS. 5A to 5F are diagrams showing an example of a modeling data generation range and of how to generate the same. FIG. 5A shows a modeling data generation range on a three-dimensional space, and FIG. 5B shows the yz-plane of the modeling data generation range shown in FIG. 5A. FIG. 5C shows an example of 3D models within the modeling data generation range on the three-dimensional space. FIG. 5D shows the y-z plane in a case where a spectator stand exists within the modeling data generation range. FIG. 5E shows an example of 3D model figures corresponding to the 3D models shown in FIG. 5C. FIG. 5F shows another example of 3D model figures corresponding to the 3D models shown in FIG. 5C.

In FIG. 5A, a virtual camera (such as the position 301 and the space (viewing frustum) 305) is shown on the three-dimensional space, and a z=0 plane (e.g., a field in a stadium) 500 to be captured is shown in the same space. As shown in FIG. 5A, a modeling data generation range 510 is determined based on a plane (bottom surface) 501 which is within the z=0 plane 500 and is included in the space (viewing frustum) 305 which is the virtual camera rendering range.

The modeling data generation range 510 is part of the space (viewing frustum) 305 which is the virtual camera rendering range. The modeling data generation range 510 is a space surrounded by the plane 501, a front plane 513 located close to the front clipping plane 303, and a back plane 514 located close to the back clipping plane 304. The lateral side of the space as the modeling data generation range 510 is set based on the position 301 and angle view of the virtual camera and the plane 500. The upper side of the space as the modeling data generation range 510 is set based on the position 301 and angle view of the virtual camera.

The plane 513 and the plane 514 are described using FIG. 5B. FIG. 5B is a schematic side view of the virtual camera and the z=0 plane in FIG. 5A. The plane 513 is a plane that passes through an intersection 503 or 505, is located at a predetermined distance from the front clipping plane 303 within the space 305, and is parallel to the front clipping plane 303. The plane 514 is a plane that passes through an intersection 504 or 506, is located at a predetermined distance from the back clipping plane 304 within the space 305, and is parallel to the back clipping plane 304. The predetermined distance is set in advance. The plane 501 is a rectangle having the intersections 503 to 506 as vertices.

Note that the plane 514 may be the same as the back clipping plane 304. Note that the plane 513 and the plane 514 do not have to be parallel to the front clipping plane and the back clipping plane, respectively. For example, the plane 513 and the plane 514 may each be a plane that passes a vertex of the plane 501 and is perpendicular to the plane 501.

The modeling data generation range 510 may be determined considering not only the above, but also, e.g., a spectator stand in a stadium. This example is described using FIG. 5D. Like FIG. 5B, FIG. 5D schematically shows a rendering range with the virtual camera and the z=0 plane in FIG. 5A viewed from the side. In FIG. 5D, the plane 514 may be determined based on the position of a spectator stand 507 in the stadium. Specifically, the plane 514 is set to a plane that passes through the intersection between the spectator stand 507 and the plane 501 and that is parallel to the back clipping plane. This allows the modeling data generation range 510 not to include the back of the spectator stand 507.

A spectator stand in the stadium is not the only thing that can be added to conditions for determining the modeling data generation range, and a user may be allowed to specify an object and the like manually. The plane 500 that intersects with the viewing frustum is not limited to z=0, and may be any shape. For example, the plane may be bumpy like an actual field. In a case where a 3D model of the actual field in the background has bumpiness, the bumpy 3D model may be corrected to a planar 3D model. The modeling data generation range may be configured without a flat or curved plane intersecting with the viewing frustum. In this case, the virtual camera rendering range may be used as the modeling data generation range as it is.

In S406, the modeling data generation unit 204 obtains, from the database 103, 3D models of objects included in the modeling data generation range determined in S405.

Using the drawings, a description is given of an example table of event information and an example table of 3D model information that are managed by the database 103. FIGS. 6A and 6B are diagrams showing tables of information managed by the database 103, FIG. 6A showing an event information table and FIG. 6B showing a 3D model information table. In an event information table 610 managed by the database 103, as shown in FIG. 6A, the storage location of 3D model information is shown for each of the objects for every time code of the captured event. For instance, the event information table 610 shows that 3D model information on an object A at a time code "16:14:24.041" is stored in "DataA100."

As shown in FIG. 6B, a 3D model information table 620 managed by the database 103 has stored therein data on the following items: "coordinates of all dots," "texture," "average coordinates," "barycentric coordinates," and "maximum and minimum coordinates." Stored in "coordinates of all dots" is data related to the coordinates of every dot in the group of dots forming the 3D model. Stored in "texture" is data related to a texture image added to the 3D model. Stored in "average coordinates" is data related to the average coordinates of all the dots forming the 3D model. Stored in "barycentric coordinates" is data related to the coordinates of a dot at the barycenter based on the coordinates of all the dots forming the 3D model. Stored in "maximum and minimum coordinates" is data on the maximum coordinates and minimum coordinates of dots among the coordinates of the dots forming the 3D model. Note that the items of data stored in the 3D model information table 620 are not limited to all of the "coordinates of all dots," "texture," "average coordinates," "barycentric coordinates," and "maximum and minimum coordinates." For example, the 3D model information table 620 may only have "coordinates of all dots" and "texture" or may additionally have other items.

In response to a certain time code being specified, 3D model information on each object related to the time code specified can be obtained using the information shown in FIGS. 6A and 6B, the 3D model information including, e.g., the coordinates of all the dots and the maximum and minimum coordinates for each axis in the three-dimensional coordinate system.

Using FIG. 5C, a description is given of an example of obtaining a 3D model included in the modeling data generation range from the database 103. In the database 103, the modeling data generation unit 204 refers to 3D model information on objects associated with the time code specified in S401, and determines for each of those objects whether the object is included in the modeling data generation range determined in S406.

For example, the determination may be made by determining, for each piece of 3D model information on an object such as a person, whether the generation range includes the coordinates of all the dots included in the 3D model information or whether the generation range includes only the average coordinates of all the dots or the maximum/minimum coordinates for each axis in the three-dimensional coordinate system.

FIG. 5C shows an example where the modeling data generation range 510 includes three 3D models as a result of the above determination. Although details will be described later, in a case where modeling data includes these three 3D models, the 3D models look like 3D models 531 to 533 in FIG. 5E.

Note that a result of determination on each object whether the object is included in the modeling data generation range may be presented on the operation screen 320 on the tablet. For instance, in a case where a certain object is on the border of the modeling data generation range 510, a warning or the like may be presented as a determination result, informing that not the entire object is outputted as modeling data because the object is on the border.

The determination processing in S406 may be executed at any time while user operations are received with regards to the time code for a virtual viewpoint image in S401 and the position and attitude of the virtual camera in S402. In a case where such determination processing in S406 is executed at any time, a warning may be presented informing that a target object is on the border.

The 3D model of an object may be obtained not only automatically based on the above-described determination result, but also manually. For example, an object for which a 3D model is to be obtained may be specified using the operation screen 320 on the tablet, by receiving a user operation, such as a tap operation, performed on an object that the user wants as modeling data.

Also, in the processing in S406, among the objects included in the modeling data generation range, 3D model information on the field and the spectator stand, which are backgrounds, may be obtained from the database. In this case, the 3D models of the field and spectator stand thus obtained may be partially transformed to serve as a base. For example, even in a case where the 3D model of the field has no thickness, a prescribed height may be added to transform the 3D model, so as to have a cuboid base 540 as shown in FIG. 5E.

In S407, the modeling data generation unit 204 generates a 3D model of an object that is not actually present but that is used to assist the 3D model obtained from the database. For example, the player as the 3D figure model 532 on the foreground in FIG. 5E is jumping, not touching the field and up in the air. Thus, to showcase this 3D figure model, a support post (a support portion) is necessary as an assistance to support and affix the 3D figure model to the base. Thus, in S407, using the 3D model information on each object obtained from the database 103, the modeling data generation unit 204 first determines whether an assist portion is necessary. This determination includes determining whether a target 3D model is in the air and determining whether the target 3D model stands on the base by itself. The determination of whether the target 3D model is in the air may be made using, for example, the coordinates of all the dots or the minimum coordinate included in the 3D model information. The determination of whether a target 3D model stands on the base by itself may be made using, for example, the coordinates of all the dots or the barycentric coordinates and the maximum and minimum coordinates included in the 3D model information.

Then, if it is determined that a 3D model needs an assist portion, the modeling data generation unit 204 generates, based on the 3D model, a 3D model for the assist portion for affixing the target 3D figure model to the base. In a case where a target 3D model is up in the air, the modeling data generation unit 204 may generate a 3D model of an assist portion based on the coordinates of all the dots or based on the minimum coordinates and coordinates surrounding the minimum coordinates. In a case where the target 3D model does not stand by itself, the modeling data generation unit 204 may generate a 3D model of an assist portion based on the coordinates of all the dots or based on the barycentric coordinates and the maximum and minimum coordinates. Note that the support post may be positioned to provide support vertically from the barycentric coordinates included in the 3D model information on the object. A 3D model of a support post may be added even for an object in contact with the field.

Meanwhile, if it is determined that an assist portion is unnecessary, the modeling data generation unit 204 moves processing to S408 without generating a 3D model of an assist portion.

In S408, the modeling data generation unit 204 combines all the 3D models generated up to the processing in the previous step, S407, converts the format of the set of the 3D models thus combined into a format supported by an output destination, and outputs the set of the 3D models as data for modeling a three-dimensional object. An example of the modeling data outputted is described using FIG. 5E.

In FIG. 5E, the modeling data includes the foreground 3D models 531, 532, 533 included in the modeling data generation range 510, a support post 534, and the base 540. The coordinates of these foreground 3D models based on, e.g., people and the background 3D models based on, e.g., the field are represented by the single three-dimensional coordinate system shown in FIG. 3A, and the positional relations of these 3D models accurately replicate the positional relations and attitudes of the actual players on the field.

After the modeling data in FIG. 5E is outputted to the modeling apparatus 106, the modeling apparatus 106 can model the 3D model figures in those shapes. Thus, although the above states that FIG. 5E shows modeling data, FIG. 5E may also be interpreted as showing 3D model figures outputted from a 3D printer.

To lower the risk of damage during delivery and transport, the modeling data in FIG. 5E may be outputted in S408 as 3D models on the foreground and a 3D model on the background separately. For example, as shown in FIG. 5F, the base 540 corresponding to the background field and the 3D models 531, 532, 533 corresponding to the foreground people may be outputted separately from each other, and sub-bases 541, 542, 543 which are small in shape may be added to the 3D models 531, 532, 533, respectively. In this case, recesses 551 to 553 provided to the base 540 to correspond to the sizes of the sub-bases 541 to 543 allow the foreground 3D models 531, 532, 533 to be attached to the base 540. The sub-bases 541, 542, 543 are 3D models of objects that do not actually exist and can therefore be added as parts for assisting the 3D models on the foreground or the like in S407, as the support post is.

The shapes of the sub-bases 541 to 543 and the recesses 551 to 553 may be not only a square as shown in FIG. 5F, but also other polygons. Also, the sub-bases 541 to 543 and the recesses 551 to 553 may have different shapes like puzzle pieces. In this case, after the foreground 3D models and the background 3D model are outputted separately by the modeling apparatus, a user can attach the foreground 3D models correctly without making mistakes in terms of the positions and attitudes of attachment. Note that the positions of the sub-bases 541 to 543 and the recesses 551 to 553 in the base 540 for the respective objects may be changeable through user operations.

Modeling data outputted may have information that does not actually exist embedded in the base 540. For example, modeling data may be outputted with the base 540 having embedded therein a time code for the virtual camera used for the modeling data and information related to the position and attitude of the virtual camera. Also, modeling data may be outputted with the base 540 having embedded therein three-dimensional coordinate values indicative of the modeling data generation range.

As thus described, the present embodiment can generate modeling data on an object in accordance with specification information specified by user operations. More specifically, based on a virtual camera rendering range in accordance with the specification information, modeling data on an object included in the virtual camera rendering range can be generated.

For example, for a field sport held in a stadium, such as rugby or soccer, modeling data on a critical scene that leads to a score can be generated, cutting out the scene according to a given time code and a given spatial range and representing the positional relations and attitudes of actual players. In addition, the data may be used and outputted to a 3D printer so that 3D model figures of that scene can be generated.

In a case where shape data which represents the three-dimensional shape of an object and is used to generate a virtual viewpoint image is in the same format as modeling data on the object, the following processing is performed in S408. Specifically, the modeling data generation unit 204 outputs, as modeling data on an object, data generated by the processing up to the previous step, S407, the data having the 3D model of the assist portion added to the 3D model of the object. In this way, in a case where shape data used for generating a virtual viewpoint image is in the same format as modeling data, the shape data used for generating a virtual viewpoint image can be outputted as modeling data as it is.

Embodiment 2

In a mode described in the present embodiment, a plurality of virtual cameras are used to generate modeling data based on their rendering ranges.

In the present embodiment, an information processing system and an image generating apparatus have the same configuration as that shown in FIGS. 1A and 1B and the same configuration as that shown in FIGS. 2A and 2B, respectively, and are therefore not described here. The following describes differences. What is described in the present embodiment is mainly how a plurality of virtual cameras are used and operated in the tablet 105 or the image generating apparatus 104 and how modeling data generation processing is performed based on their rendering ranges.

(Modeling Data Generation Processing)

Figure 7:
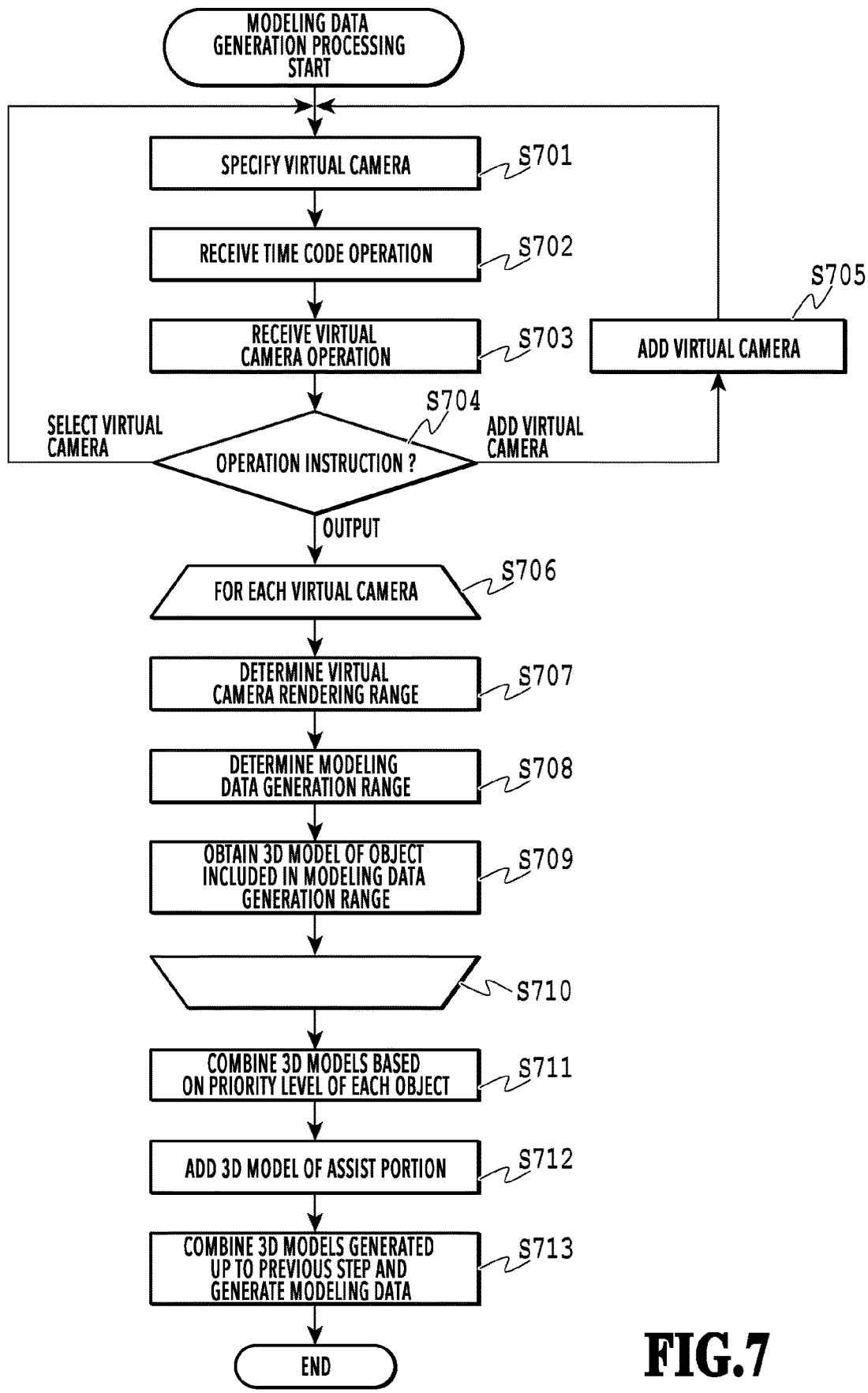
FIG. 7 is a flowchart showing a sequence of steps of modeling data generation processing.
Figure 8A:
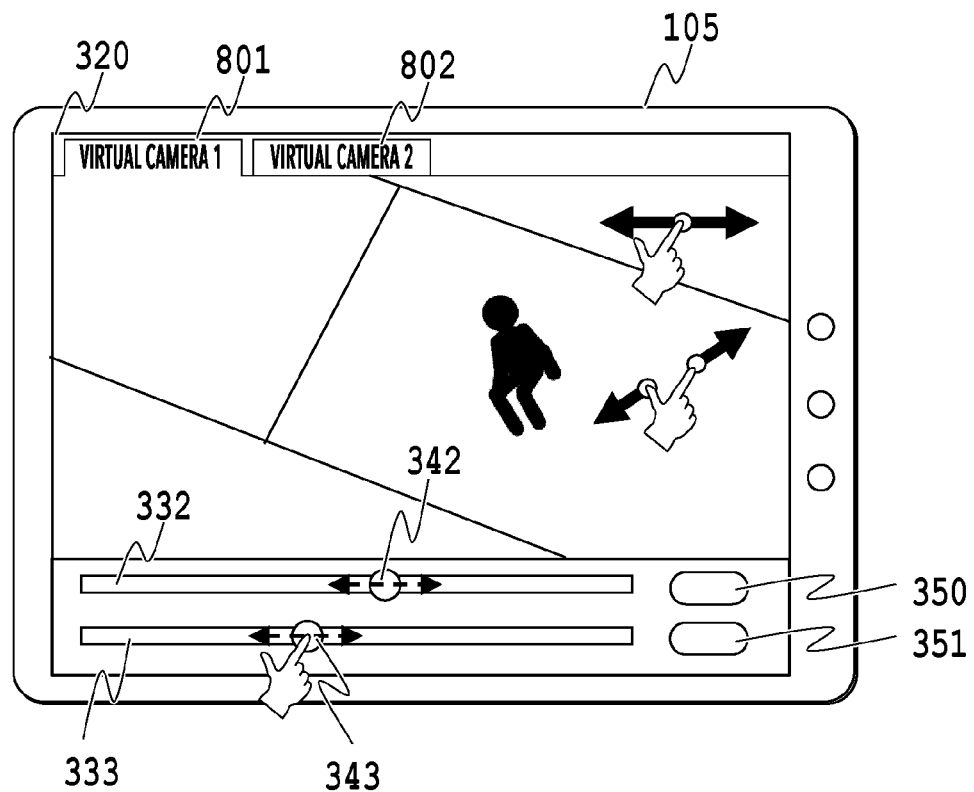
FIGS. 8A to 8D are diagrams showing an example of how to specify and generate the rendering ranges of a plurality of virtual cameras.
Figure 8B:
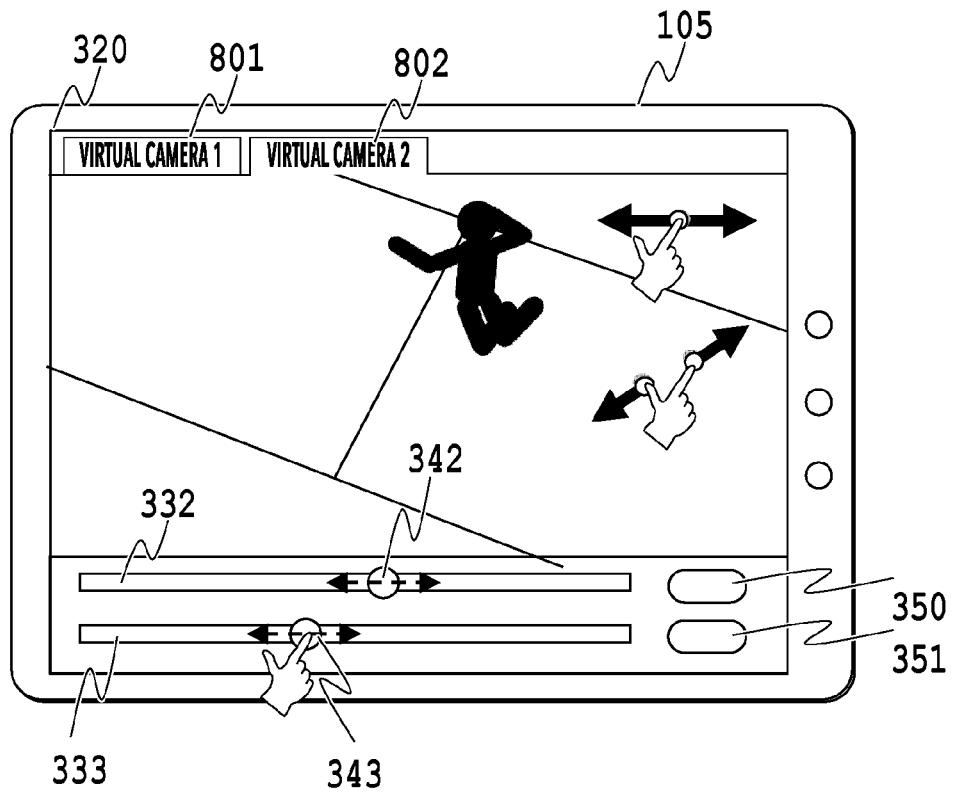
Figure 8C:
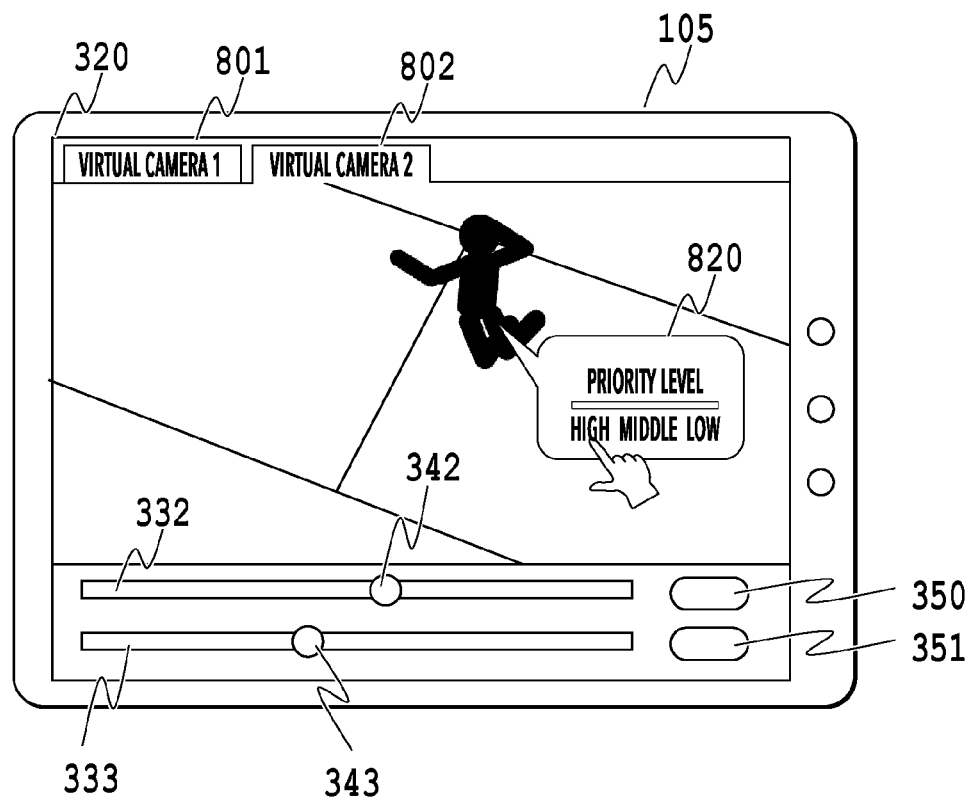
Figure 8D:
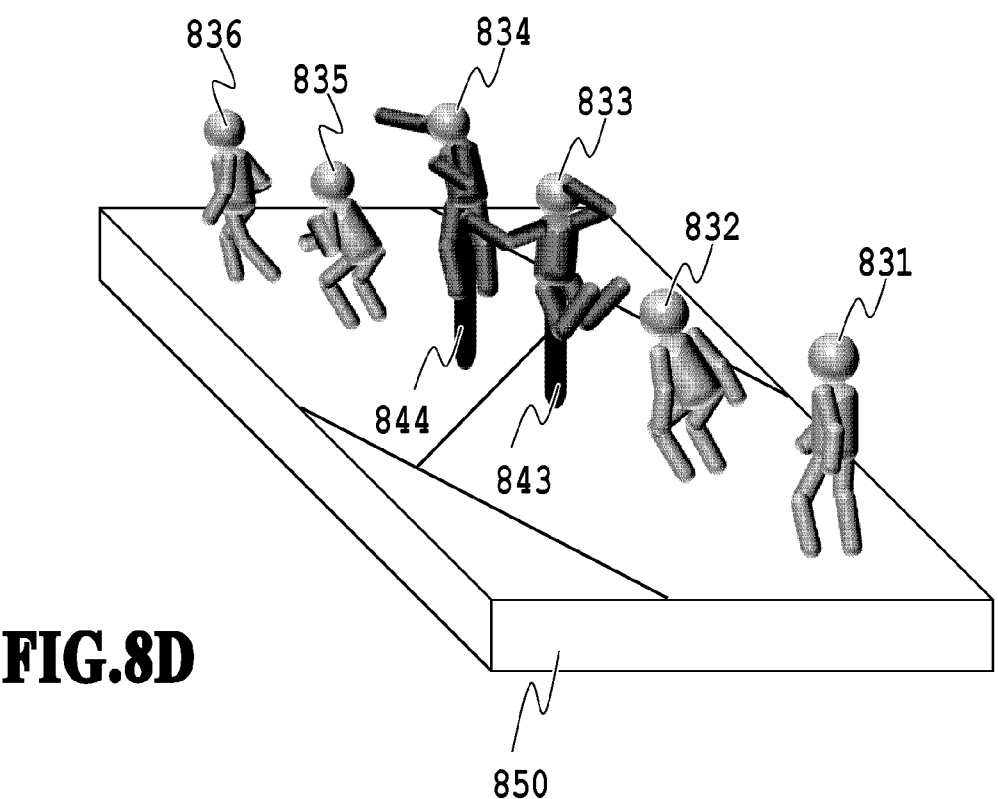

Using the drawings, a description is given of modeling data generation processing according to the present embodiment. FIG. 7 is a flowchart showing a sequence of the steps of the modeling data generation processing according to the present embodiment. Note that a series of the following processing steps are implemented by the CPU 211 executing a predetermined program to effect the operation of the functional units shown in FIG. 2A. FIGS. 8A to 8D are diagrams illustrating an example screen for operating a virtual viewpoint (or a virtual camera). FIG. 8A shows a case where a virtual camera 1 is being selected, FIG. 8B shows a case where a virtual camera 2 is being selected, FIG. 8C shows a case where a priority-level setting screen is presented in FIG. 8B, and FIG. 8D shows an example of 3D models. Note that the operation screen shown in FIGS. 8A to 8C is a screen functionally enhanced from the operation screen shown in FIG. 3F, and therefore only differences are described here.

In S701, the modeling data generation unit 204 specifies a virtual camera for which to receive operations. Since a plurality of virtual cameras are handled in the present embodiment, a virtual camera is specified to identify a virtual camera for which to receive user operations in S702 and S703 following the processing in S701. In the initial state, there is only one virtual camera, and therefore the identifier of that virtual camera is specified. Ina case where there area plurality of virtual cameras, the identifier of the virtual camera selected by a user is specified. How to select a virtual camera on the operation screen will be described later.

In S702, via the virtual camera control unit 201, the modeling data generation unit 204 receives specification of a time code for a virtual viewpoint image obtained by image capture by the virtual camera specified in S701. How to specify the time code is the same as that described in relation to S401, and is therefore not described here.

In S703, via the virtual camera control unit 201, the modeling data generation unit 204 receives operation information on the virtual camera specified in S701. How to operate the virtual camera is the same as that described in relation to S402, and is therefore not described here.

In S704, the modeling data generation unit 204 receives an instruction to be described below and determines the type of the instruction received. The user instruction received here is either selecting a virtual camera, adding a virtual camera, or outputting modeling data. "Selecting a virtual camera" is an instruction to select a virtual camera presented on the tablet 105, different from the one selected in S701. "Adding a virtual camera" is an instruction to add a virtual camera not presented on the tablet 105, different from the virtual camera specified in S701. The instruction to add a virtual camera is issued by, for example, pressing down of the add button 350 shown in FIG. 8A. "Outputting modeling data" is an instruction to output modeling data.

If it is determined that the operation instruction is "adding a virtual camera," the modeling data generation unit 204 moves processing to S705.

In S705, the modeling data generation unit 204 adds a virtual camera. The screen displayed on the tablet 105 is switched from the operation screen shown in FIG. 8A to the operation screen shown in FIG. 8B. To the operation screen 320, a new tab 802 is added, and a virtual camera is also added. Operations for specifying a time code for a virtual viewpoint image obtained by image capture by the additional virtual camera and the position and attitude of the additional virtual camera can be received on the tab screen thus added.

As an example scene in which a player is playing in a game, FIG. 8A to FIG. 8D show a virtual viewpoint image of a scene where a volleyball player spikes a ball. FIG. 8A shows a scene where the volleyball player is stepping ahead and bending their knees before jumping, and FIG. 8B shows a scene at a time code later than the scene in FIG. 8A, where the volleyball player is jumping up and swinging their arm up before striking the ball.

Although FIGS. 8A to 8C show a case where there are two tabs and two virtual cameras, the present disclosure is not limited to this. There may be three or more tabs and virtual cameras. Also, as will be described later, in the output example in FIG. 8D, the volleyball player's spike scene is chronologically shown by using six virtual cameras and operating the time code for each of the virtual viewpoint images obtained by image capture by the respective virtual cameras and the positions and attitudes of the respective virtual cameras.

Also, with regards to a time code for a virtual viewpoint image obtained by image capture by an additional virtual camera and the position and attitude of the additional virtual camera, the values for the virtual camera being presented on the screen at the time of the reception of the add instruction may be used as the initial values for the additional virtual camera.

If it is determined in S704 that the operation instruction is "selecting a virtual camera," the modeling data generation unit 204 moves processing back to S701 to execute a series of processing steps S701 to S703 with respect to the virtual camera selected. The instruction to select a virtual camera is issued by, for example, a user operation performed on the tab 801 or 802 shown in FIG. 8A. In a case where an image including the tabs 801 and 802 is displayed on the touch panel, the user operation may be a regular touch operation or the like.

For the spike scene in FIGS. 8A to 8D, a scene where the volleyball player is at the highest jump, a scene where the volleyball player is striking the ball, and the like can be easily specified by detailed operations regarding, e.g., time codes for the virtual viewpoint images obtained by the image capture by the respective virtual cameras.

If it is determined above in S704 that the operation instruction is "outputting modeling data," the modeling data generation unit 204 moves processing to S706. The instruction to output modeling data is issued by, for example, a user operation performed on the output button 351 shown in FIG. 8A. Once the output button 351 is pressed down by a user operation, the time codes for the virtual viewpoint images obtained by image capture by all the virtual cameras and the positions and attitudes of all the virtual cameras that have been specified up to the previous step are finalized, and processing proceeds to S706.

From S706 to S710, the modeling data generation unit 204 executes processing for all the virtual cameras specified in S701.

In S707, the modeling data generation unit 204 determines the rendering range of the virtual camera using the time code for a virtual viewpoint image received in the processing in S702 and virtual camera viewpoint information received in the processing in S703, the viewpoint information including the position and attitude of the virtual camera. How to determine the rendering range of a virtual camera is the same as that described in relation to S404 and is therefore not described here.

In S708, based on the virtual camera rendering range determined in S707, the modeling data generation unit 204 determines a modeling data generation range corresponding to the virtual camera. How to determine the modeling data generation range is the same as that described in relation to S405 and is therefore not described here.

In S709, the modeling data generation unit 204 obtains, from the database 103, the 3D model of an object included in the modeling data generation range of the virtual camera determined in S708. How to obtain the 3D model is the same as that described in relation to S406 and is therefore not described here.

In S711, based on the priority levels of the objects, the modeling data generation unit 204 combines the 3D models included in the modeling data generation ranges determined for the respective virtual cameras obtained up to the previous step.

The priority level of each object is a parameter set while the virtual cameras are operated in S702 and S703 and is referred to at the time of generating modeling data. The priority level of each object is described using FIG. 8C. As shown in FIG. 8C, a priority-level setting screen 820 is displayed in response to, for example, a long tap performed on an object on the operation screen 320. In response to a user operation selecting one of the selection items (e.g., HIGH, MIDDLE, and LOW) presented on the priority-level setting screen 820, the selected priority level is set. Note that the number of selection items for the priority level is not limited to three. The initial value of the priority level may be set in advance for each object, so that in a case where no priority level is set on the setting screen 820, the initial value may be set as the priority level for the object.

In this combining based on their priority levels, modeling data is generated such that an object with high priority level stands out through, e.g., processing to make an object with middle or low priority level low in color density and light in color compared to the object with high priority level. The processing to make the color lighter may be, for example, processing to decrease at least one of the brightness and saturation of the color of the object. Using FIG. 8D, a description is given about a plurality of objects thus combined. Although details will be described later. FIG. 8D shows an example where 3D models 831 to 836 of six objects are combined using virtual cameras capturing six virtual viewpoint images with different time codes and are outputted as modeling data. In FIG. 8D, the 3D models 831 to 836 are combined such that the 3D model 833 and the 3D model 834 are set to priority level "HIGH" and are in regular color, whereas the 3D models 831, 832, 835, and 836 are set to priority level "LOW" and are in lighter color. Such priority level settings allow generation of modeling data emphasizing an object corresponding to a time code of note.

In a case where a plurality of objects overlap, modeling data may be generated as follows. Specifically, in the modeling data, the overlapping objects may be combined such that an object with "HIGH" priority level is located on a front side relative to an object with "LOW" priority level.

In S712, the modeling data generation unit 204 generates a 3D model for assisting a 3D model obtained from the database, though such an object does not actually exist. How to generate the 3D model of an assist portion is the same as that described in relation to S407 and is therefore not described here.

In S713, the modeling data generation unit 204 generates modeling data by combining the set of 3D models generated up to the previous step, S712. An example of modeling data thus combined is described using FIG. 8D.

In FIG. 8D, using six viewpoint images and virtual cameras with different time codes and different positions and attitudes, the modeling data is generated by combining 3D models that are included in the respective modeling data generation ranges and are obtained from the database 103. Specifically, the modeling data includes 3D models 831 to 836 of a person, 3D models 843, 844 of support posts, and a 3D model 850 of a base.

The coordinates of these foreground 3D models based on, e.g., people and the background 3D models based on, e.g., the field are represented by the single three-dimensional coordinate system shown in FIG. 3A, and the positional relations of these 3D models accurately replicate the positional relations and attitudes of the actual players on the field.

Also, data on 3D models of even the same person (or object) can be outputted as follows using virtual viewpoint images at different time codes obtained by image capture by a plurality of virtual cameras. Specifically, by calculation of the modeling data generation ranges based on their rendering regions, a series of actions of the athlete can be outputted as modeling data providing a chronological representation thereof.

Note that a target object is not limited to one, and it goes without saying that different time codes for virtual viewpoint images and virtual cameras with different positions and attitudes can be specified for a plurality of objects as shown in Embodiment 1.

As thus described, the present embodiment can generate object modeling data in accordance with a plurality of pieces of specification information specified by user operations. In other words, modeling data on a plurality of objects can be generated based on a plurality of virtual camera rendering ranges in accordance with the specification information.

For example, a series of actions (or continuous movement) of a professional athlete can be combined into a single 3D model figure and outputted as modeling data. For example, modeling data can be outputted which provides a chronological representation of, e.g., a spike scene of a volleyball player or a jump scene of a figure skater.

Other Embodiments

In the examples described in the above embodiments, modeling data is generated using a virtual viewpoint image generated using 3D models each generated based on a plurality of captured images. However, the present disclosure is not limited to this, and the present embodiments are also applicable to moving images using 3D models generated using, for example, computer graphic (CG) software or the like.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present embodiments disclosed herein can easily model a three-dimensional object of an object to be modeled in a given scene in moving images.

This application claims the benefit of Japanese Patent Application No. 2021-030905, filed Feb. 26, 2021, which is hereby incorporated by reference wherein in its entirety.

What is claimed is:

1. An information processing apparatus comprising:
one or more memories storing instructions; and
one or more processors executing the instructions to:
identify, in a virtual viewpoint image generated using shape data representing a three-dimensional shape of an object, a target for which to generate data for modeling a three-dimensional object, based on time information related to the virtual viewpoint image as well as a position of a virtual viewpoint and a direction of a line of sight from the virtual viewpoint related to the virtual viewpoint image,
identify, based on the position of the virtual viewpoint and the direction of the line of sight from the virtual viewpoint, an object generation range as a target for the modeling data,
obtain shape data on a first object in the virtual viewpoint image, the first object corresponding to the identified target in the object generation range, and
output data for modeling a three-dimensional object generated based on the obtained shape data.

2. The information processing apparatus according to claim 1, wherein
the one or more processors further executing the instructions to convert a format of the obtained shape data into a format supported by an output destination and then outputs the converted data as the data for modeling a three-dimensional object.

3. The information processing apparatus according to claim 1, wherein
the one or more processors further executing the instructions to identify the object generation range based on a rendering range related to a display on which the virtual viewpoint image is displayed.

4. The information processing apparatus according to claim 3, wherein
the one or more processors further executing the instructions to identify the object generation range based on a position of a second object included in the rendering range, the second object different from the first object.

5. The information processing apparatus according to claim 1, wherein
depending on a position and an attitude of the first object, the one or more processors further executing the instructions to output the data for modeling a three-dimensional object including a support part for supporting the first object.

6. The information processing apparatus according to claim 1, wherein
the one or more processors further executing the instructions to output the data for modeling a three-dimensional object in which a ground included in the modeling-data generation range serves as a base for the first object.

7. The information processing apparatus according to claim 1, wherein
one or more processors further executing the instructions to:
obtain a plurality of pieces of the shape data, and
output the data for modeling a three-dimensional object generated based on the plurality of pieces of shape data obtained.

8. The information processing apparatus according to claim 1,
the one or more processors further executing the instructions to:
set priority level for each object; and
output the data for modeling a three-dimensional object generated based on a plurality of pieces of the shape data obtained, in accordance with the priority level of each object.

9. The information processing apparatus according to claim 8, wherein
the one or more processors further executing the instructions to output the data for modeling a three-dimensional object generated such that an object the priority level of which is low has color which is lower in terms of at least one of brightness and saturation than an object the priority level of which is high.

10. The information processing apparatus according to claim 8, wherein
in a case where the plurality of objects overlap, the one or more processors further executing the instructions to output the data for modeling a three-dimensional object in which an object the priority level of which is high is located on a front side relative to an object the priority level of which is low.

11. The information processing apparatus according to claim 1, wherein
the one or more processors further executing the instructions to output the data for modeling a three-dimensional object generated such that
a sub-base is provided for the first object,
a ground included in the modeling-data generation range is set as a base, and
the base is provided with a recess corresponding to the sub-base.

12. The information processing apparatus according to claim 11, wherein
a shape of the sub-base is different for each corresponding object.

13. The information processing apparatus according to claim 1, wherein
the object generation range includes a part of space which fits into an angle view of the virtual viewpoint.

14. An information processing method comprising:
identifying, in a virtual viewpoint image generated using shape data representing a three-dimensional shape of an object, a target for which to generate data for modeling a three-dimensional object, based on time information related to the virtual viewpoint image as well as a position of a virtual viewpoint and a direction of a line of sight from the virtual viewpoint related to the virtual viewpoint image;
identifying, based on the position of the virtual viewpoint and the direction of the line of sight from the virtual viewpoint, an object generation range as a target for the modeling data,
obtaining shape data on a first object in the virtual viewpoint image, the first object corresponding to the target identified in the identifying; and
outputting data for modeling a three-dimensional object generated based on the shape data obtained in the obtaining.

15. A non-transitory computer readable storage medium storing a program for causing a computer to perform a control method, the method comprising:
identifying, in a virtual viewpoint image generated using shape data representing a three-dimensional shape of an object, a target for which to generate data for modeling a three-dimensional object, based on time information related to the virtual viewpoint image as well as a position of a virtual viewpoint and a direction of a line of sight from the virtual viewpoint related to the virtual viewpoint image, identifying, based on the position of the virtual viewpoint and the direction of the line of sight from the virtual viewpoint, an object generation range as a target for the modeling data, obtaining shape data on a first object in the virtual viewpoint image, the first object corresponding to the target identified in the identifying, and outputting data for modeling a three-dimensional object generated based on the shape data obtained in the obtaining.

* * * * *